United States Patent Office 3,753,852
Patented Aug. 21, 1973

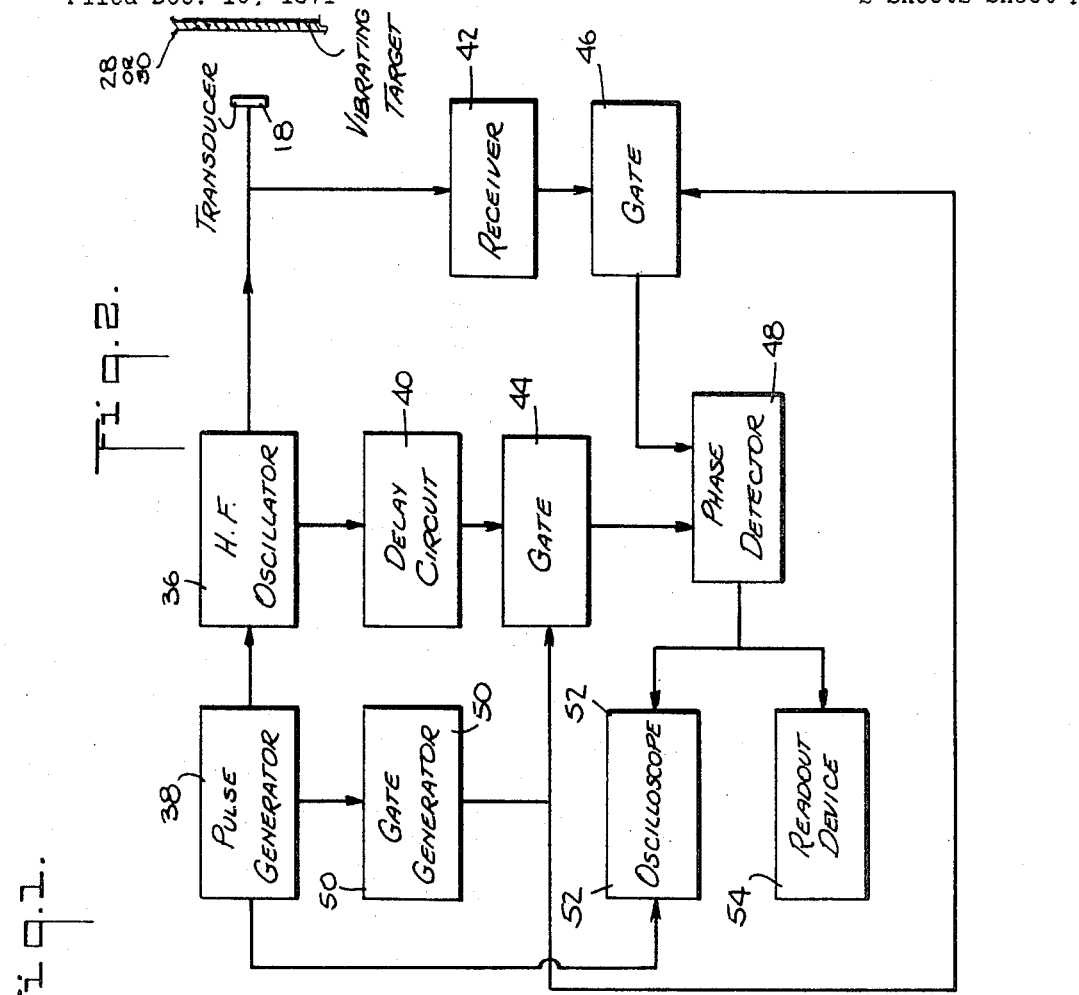
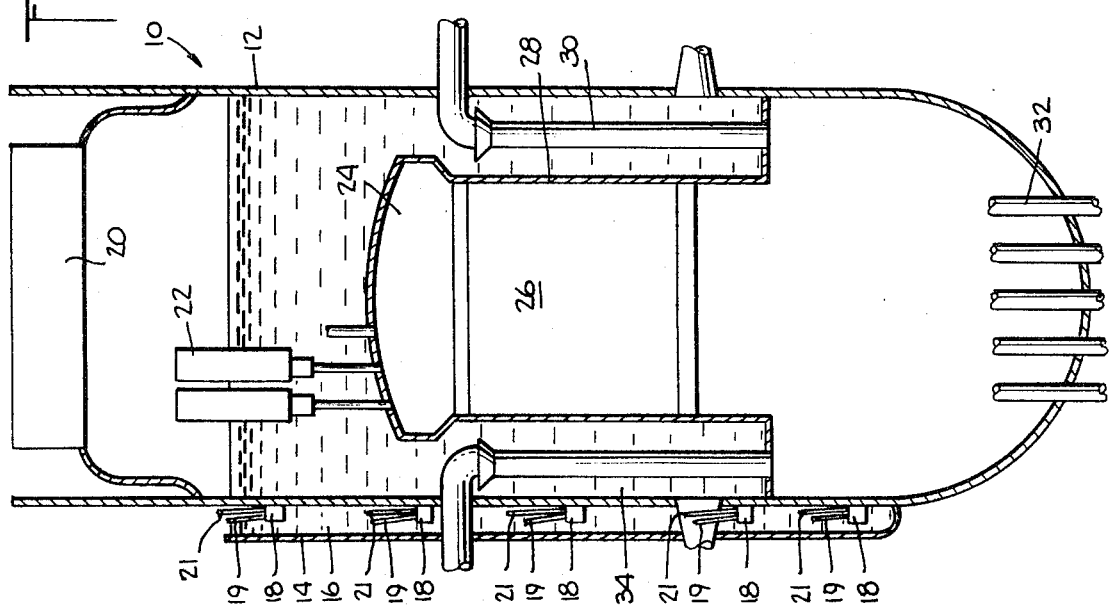

3,753,852
ULTRASONIC SYSTEM FOR MONITORING
VIBRATIONS IN A NUCLEAR REACTOR
Clyde C. Scott, 31043 Pierce Drive, Birmingham, Mich. 48009, and James P. Lagowski, 1755 Beverly Blvd., Berkeley, Mich. 48072
Filed Dec. 10, 1971, Ser. No. 206,811
Int. Cl. G21c 17/00, 17/06; G01n 9/24
U.S. Cl. 176—19 R   5 Claims

ABSTRACT OF THE DISCLOSURE

Apparatus for detecting the frequency and amplitude of vibration of a preselected vibrating member inside a nuclear reactor vessel from an external point including a transducer mounted on the outside of the vessel for transmitting a signal to said member and receiving an echo back from the vibrating member, a pulse generator for generating repetitive pulses, a high-frequency oscillator triggered by the pulse generator, the transducer being excited by the high-frequency pulses for transmitting the signal, a delay circuit having a time delay equivalent to the time interval for ultrasonic pulses travelling between the transducer and the operating member, a phase detector, a gate circuit synchronized with the pulse generator for feeding the delayed transmitting pulses and the corresponding receiving echoes simultaneously to the phase detector, and read-out means for the frequency and amplitude of vibration of the vibrating member.

---

This invention relates to an ultrasonic system for continuously or periodically monitoring vibrations inside a nuclear reactor vessel. In certain reactor vessels, there are mechanically vibrating members that generate reactor noise. Usually, this kind of noise is mixed with other machine noises in a reactor building. It is difficult to separate one particular noise from others by a simple sound pickup transducer.

Heretofore, vibration monitoring of parts inside nuclear reactors has been done with various types of sensors located internally of the reactor vessels. These sensors are useful during the initial cold (non-nuclear) tests. Limited success with accelerometers, LVDT's and strain gauges has been achieved during initial hot operations. All of these sensors require electrical leads running through the pressure vessel wall. While the foregoing techniques for vibration monitoring may be utilized during the early days of reactor operation, they are impractical due to their short life for long term operation under the temperature and radiation environment of a nuclear reactor. Replacement of the internally mounted sensors would be extremely difficult, and add to the plant downtime for removal and replacement of the sensing elements.

In order to overcome this difficulty we have conceived an ultrasonic vibration detector that measures the frequency and amplitude of preselected members vibrating inside the nuclear reactor vessel from a location outside of the vessel.

The concept of vibration detection according to this invention is based on utilizing a pulse-echo ultrasonic system. When an ultrasonic transducer emits a series of ultrasonic pulses toward a vibrating target, the information of the vibration is obtained from the echoes reflected from the target. The distance between the wall of the vessel and the vibrating member, the amplitude and the frequency of vibration and the thickness of the vessel wall are taken into consideration. If the system is employed with a boiling water reactor, the sound velocity in water at a normal operating temperature of about 550° F. is 3,230 feet per second. The time for an ultrasonic wave travelling back and forth over a five mil distance is about 0.258 microsecond, which is assumed as the vibration amplitude. Hence, 2.58 microseconds are assumed for a 50 mil vibration. For a large amplitude vibration, i.e., greater than 50 mils, the amplitude can be simply read from the time shift of the echo pulses, and the frequency can be counted from the number of echoes with maximum time shift per unit time. For a small amplitude vibration, i.e., less than 50 mils, it is difficult to read accurately from the time shift of the echo pulses. However, the time shift due to a small vibration is still significant in comparison with the period of an ultrasonic wave. For example, 0.258 microsecond for a 5 mil vibration corresponds to a 23.2 degree phase shift of a 250 kHz. ultrasonic wave. Accordingly, the information obtained from the phase shift of the carrier frequency of an echo can be used for amplitude measurement for a sound vibration. Because the magnitude of vibration varies periodically with time, the amount of phase shift will correspondingly vary periodically so that the frequency of vibration can be obtained from the period of phase variation.

In a boiling water reactor, for example, the vessel wall thickness is about a few inches, such as about 10 inches for example, and the inner face of the wall is coated with different metal having a thickness of the order of about ¼ inch. The amplitude of both the transmitting pulses and the receiving echoes are reduced due to the reflection of the ultrasonic waves at the interfaces between the two metals and between the wall and the water because of the mismatching of acoustic impedances at these interfaces. This effect is overcome by increasing the applied voltage of the transmitting pulses and/or by increasing the dielectric strength between the electrodes of a piezoelectric disk type transducer by inserting a layer of mica sheet between the electrodes, as is known in the art.

The invention is particularly adapted, among other possible uses, for measuring the vibration of the jet pump housing, core shroud, and the like in a boiling water reactor, or the thermal shield, core barrel support, or the like, in a pressure water reactor. These elements have a tendency to vibrate during normal operation of the reactor and over a long period of time the vibrations may become excessive due to severe factors. Continuous or periodic monitoring of the vibration of these members gives an indication to the operators of the condition thereof and forewarns them if remedial action is necessary.

In one form of our invention we provide a new and improved ultrasonic system for monitoring the vibration of components inside a nuclear reactor vessel from a fixed external point, said system including a nuclear reactor vessel having an outer wall, and a transducer mounted on the outside of the wall. Fluid coupling means interconnect the transducer with said member to form a transmission path which is of a substantially fixed length. The transducer has a transmitter section and a receiving section for receiving echoes from the vibrating member. A pulse generator is provided for generating repetitive pulses and a high-frequency oscillator is triggered by the pulse generator. The transducer is excited by the high frequency pulses from the oscillator for transmitting a signal. A delay circuit is provided having time delays equivalent to the time interval for the ultrasonic waves to travel between the transducer and the vibrating member. A gate circuit synchronized with said pulse generator is employed for feeding the delayed transmitting pulses and the corresponding receiving echoes simultaneously into a phase detector, and read-out means are employed for giving the frequency and amplitude of vibration of the vibrating member.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis for the designing of other structures for carrying out the several purposes of the invention. It is important, therefore, that this disclosure be regarded as including such equivalent constructions as do not depart from the spirit and scope of the invention. One embodiment of the invention has been chosen for purposes of illustration and description, and is shown in the accompanying drawings, forming a part of the specification, wherein:

FIG. 1 is a vertical, medial sectional view of a boiling water reactor incorporating the ultrasonic vibration system of this invention;

FIG. 2 is a block diagram of the primary components of the invention, with a flow diagram indicating the flow of signal information through the system.

Figure 3:
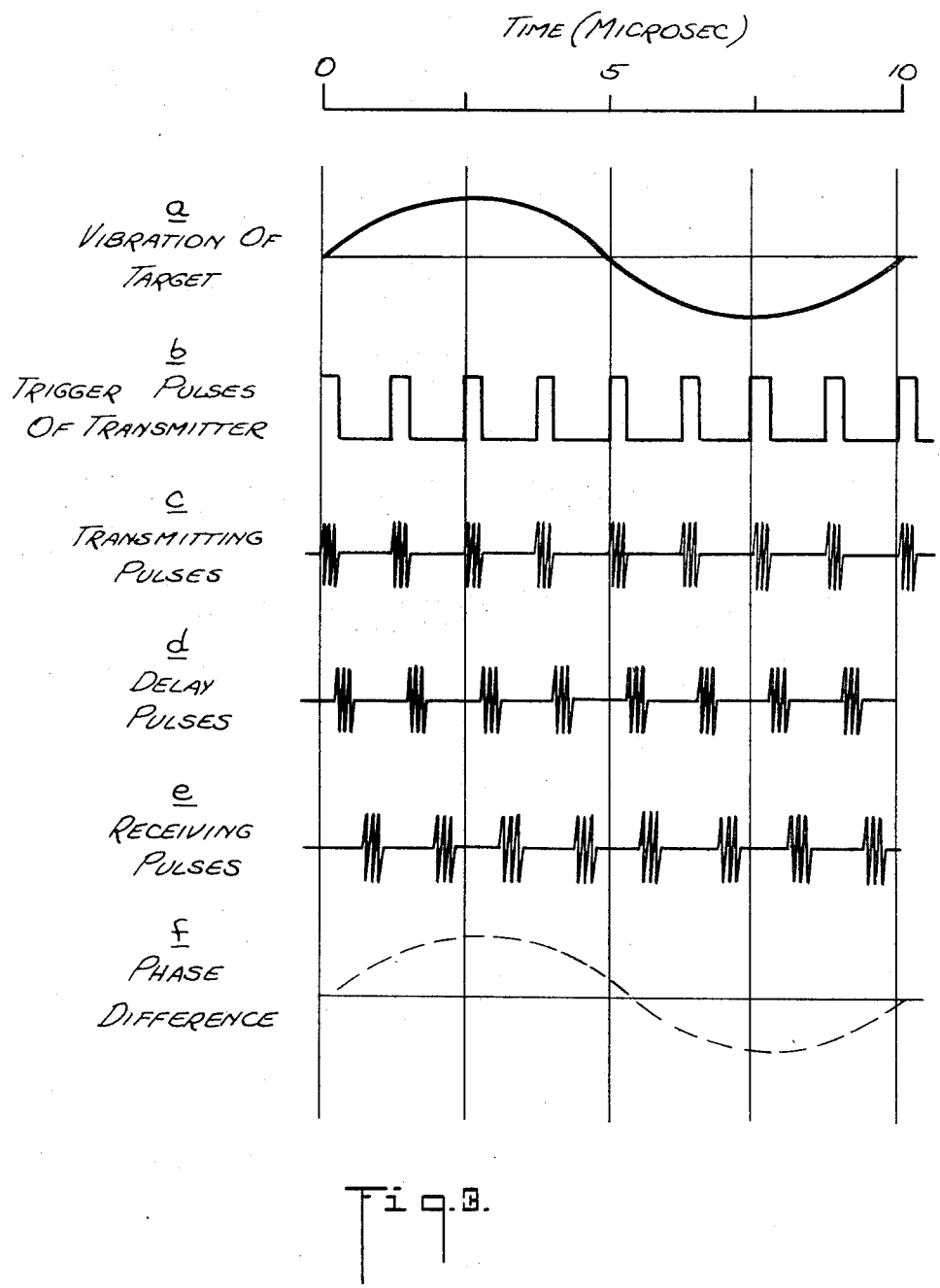
FIGS. 3a, b, c, d, e, and f illustrate wave forms at the output of various stages of the system.

In the embodiment of the invention illustrated, a boiling water reactor indicated generally at 10, FIG. 1, includes a vessel or outer wall 12, a plurality of transducer guide tubes 14 containing water 16, and transducers 18 mounted therein. The water-filled guide tube serves to guide the transducer to its proper location, and the water therein serves as a coupler for acoustic transmission. Without a good coupling between the transducer and the vessel wall, little or no sound would be transmitted to or from the reactor internals. Any suitable type of transducer may be employed such as a piezoelectric disk, for example. The position of each transducer is controlled by its respective transducer drive cable 19. Electrical leads 21 serve to connect the transducers to their respective electrical circuitry, as will be described more fully hereinafter.

As best seen in FIG. 1, the vessel contains an upper steam dryer 20, a steam separator 22, a shroud head 24, and a centrally disposed core 26 surrounded by a core shroud 28. A jet pump housing 30 is mounted outwardly of the core shroud and control rod guide tubes 32 are mounted under the core. The transducers 18 are mounted in spaced relationship with respect to each other to provide a direct path through the water 34 in the vessel to the core shroud or jet pump housing in the area where it is desired to detect the frequency and amplitude of vibration.

As best seen in FIG. 2, an oscillator 36, having frequency of the order of about 250 kHz. is coupled to the transducer 18. Any suitable type of high-frequency oscillator may be employed such as Model PG-650C as manufactured by Arulab Co., for example. The oscillator is triggered by a pulse generator 38 which generates pulses of preselected widths and repetition rates. A pulse generator that is known to be suitable for this use is the Model 212A manufactured commercially by the Hewlett-Packard Company. The transducer 18 is excited by the pulses from the oscillator 36 and receives echoes from the vibrating member, such as the core shroud 28 or the jet pump housing 30, for example, mounted with the reactor vessel.

A delay circuit 40 is coupled to the oscillator which has an output of delayed pulses having time delays equivalent to the time interval for the pulses to travel between the transducer and the vibrating member or target. A suitable delay circuit is Model DD1K as manufactured by the Allen Avionics Inc. A receiver 42 is coupled to the transducer. Any suitable type of receiver may be employed such as, for example, Model 10N as commercially manufactured by Automation Industries, Inc. A first gate 44 is coupled to the delay circuit 40 and a second gate 46 is coupled to the receiver 42. Transigate Model E550, as commercially manufactured by Automation Industries, Inc., is suitable for the gates, for example. A phase detector 48, such as one manufactured by Hewlett-Packard Co., as Model 8405A, is coupled to both gates. A gate generator 50 is interposed between the pulse generator 38 and the first and second gates to feed the delayed transmitting pulses and the corresponding receiving echoes simultaneously into the phase detector 48 in synchronization with the pulse generator. The gate generator may be Transigate Model E550, as manufactured by Automation Industries, Inc., for example. In the embodiment illustrated, an oscilloscope 52, such as type 535A, as manufactured by Tektronik Inc., is coupled between the phase detector 48 and the pulse generator 38. A read-out device 54 is coupled to the phase detector 48 for providing readout of the frequency and amplitude of vibration of the vibrating member. Model 1108 as manufactured by Honeywell, Inc. is suitable, for example.

As seen in FIG. 3, wave forms at the output of various stages of the system are illustrated. FIG. 3a illustrates a typical wave form of the vibrating member within the reactor vessel. FIG. 3b shows the wave form of the trigger pulses produced by the pulse generator 38 for triggering the oscillator 36. FIG. 3c depicts the pulses transmitted by the transducer, and FIG. 3d shows the delayed pulses coming from the delay circuit 40 while FIG. 3e shows the pulses coming from the receiver 42. FIG. 3f illustrates the phase difference which is used to determine the frequency of vibration of the member. It will be appreciated that the receiving pulses can appear either before or after the second, third or fourth transmitting pulses, depending upon the distance of the target. Because the distance of a target or member at equilibrium position is given, the pulse repetition pulse generator can be adjusted without interference with the receiving pulses.

It will thus be seen that the present invention does indeed provide an improved apparatus for detecting the frequency and amplitude of vibration of a preselected vibrating member inside a nuclear reactor vessel from an external point which is superior in simplicity, operability and relative economy as compared to prior art such apparatus. The apparatus according to this invention does not require penetration of the containment boundary. The sensors or transducers can be removed and replaced without interfering with the reactor operation or adding to reactor down-time. Because the transducers are easily replaced, the capability for essentially continuous or periodic vibration monitoring over the life of the plant can be achieved. In addition, with the external system according to the present invention, it is comparatively easy to move the transducer to permit vibration monitoring of different internal components, as desired.

Although a particular embodiment of the invention is herein disclosed for purposes of explanation, various modifications thereof, after study of this specification, will be apparent to those skilled in the art to which the invention pertains.

What is claimed and desired to be secured by Letters Patent is:

1. Apparatus for detecting the frequency and amplitude of vibration of a preselected vibrating member inside a nuclear reactor vessel from an external location comprising a nuclear reactor vessel having an outer wall, a transducer mounted on the outside of said wall at said external location for transmitting a signal to said member and receiving an echo back from said member, fluid coupling means interconnecting said transducer with said wall to form a transmission path, a pulse generator for generating repettive pulses of short widths, a high-frequency oscillator triggered by said pulse generator, said transducer being excited by high-frequency pulses from said oscillator for transmitting said signal, a delay circuit having time delays equivalent to the time interval for ultrasonic waves travelling between said transducer and said member, a phase detector, a gate circuit synchronized with said pulse generator for feeding the delayed transmitting pulses and the corresponding receiving echoes simultaneously into said phase detector, read-out means for the frequency and amplitude of vibration of said vibrating member.

2. Apparatus for detecting the frequency and amplitude of vibration of a preselected vibrating member inside a nuclear reactor vessel according to claim 1 wherein said read-out means is an oscilloscope.

3. Apparatus for detecting the frequency and amplitude of vibration of a preselected vibrating member inside a nuclear reactor vessel according to claim 1 wherein said vibrating member is a core shroud in a boiling water reactor.

4. Apparatus for detecting the frequency and amplitude of vibration of a preselected vibrating member inside a nuclear reactor vessel according to claim 1 wherein said vibrating member is a jet pump housing mounted inside a boiling water reactor.

5. Apparatus for detecting the frequency and amplitude of vibration of a preselected vibrating member inside a nuclear reactor vessel from an external location comprising a nuclear reactor vessel having an outer wall, a transducer guide tube mounted on the outside of said outer wall, fluid contained in said tube, a transducer mounted in said transducer guide tube at said external location for transmitting a signal to said vibrating member and receiving an echo back from said member, the transmission path between said transducer and said member being of fixed length and being formed of metallic components and fluid, a pulse generator for generating repetitive pulses of short width, an oscillator having a frequency of the order of about 250 kHz. triggered by said pulse generator, said transducer being excited by said pulses from the oscillator and receiving echoes from said vibrating member, a delay circuit coupled to said oscillator, the output of delayed pulses from said delay circuit having time delays equivalent to the time interval for the pulses travelling between the transducer and the vibrating member, a receiver coupled to said transducer, a first gate coupled to said delay circuit and a second gate coupled to said receiver, a phase detector coupled to said first and second gates, a gate generator interposed between said pulse generator and said first and second gate to feed the delayed transmitting pulses and the corresponding receiving echoes simultaneously into said phase detector in synchronization with the pulse generator, an oscilloscope coupled between said phase detector and said pulse generator, and a read-out device connected to said phase detector for providing read-out of the frequency and amplitude of vibration of said vibrating member.

References Cited
UNITED STATES PATENTS

| | | | |
|---|---|---|---|
| 3,264,863 | 8/1966 | Maropis | 176—19 R |
| 3,240,674 | 3/1966 | Ledwidge | 176—19 R |
| 3,597,316 | 8/1971 | Lynworth | 176—19 R |
| 3,677,073 | 7/1972 | Morgan | 73—67.9 |
| 3,667,287 | 6/1972 | Furon | 73—67.9 |
| 3,640,122 | 8/1972 | Nusbiekel | 73—67.9 |
| 3,595,069 | 7/1971 | Fowler | 73—67.2 |
| 3,416,365 | 12/1968 | Frederick | 73—67.9 |

CARL D. QUARFORTH, Primary Examiner

R. S. GAITHER, Assistant Examiner

U.S. Cl. X.R.

73—67.2—67.8, 67.9; 176—19 E. C.